United States Patent
Tomozawa et al.

(10) Patent No.: US 12,441,407 B2
(45) Date of Patent: Oct. 14, 2025

(54) VEHICLE BODY UPPER STRUCTURE

(71) Applicant: HONDA MOTOR CO., LTD., Tokyo (JP)

(72) Inventors: Kosaku Tomozawa, Wako (JP); Yusuke Takayama, Wako (JP); Masaaki Fujimoto, Wako (JP); Yoshikatsu Ota, Wako (JP); Hitomi Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 18/190,340

(22) Filed: Mar. 27, 2023

(65) Prior Publication Data

US 2023/0312001 A1 Oct. 5, 2023

(30) Foreign Application Priority Data

Mar. 31, 2022 (JP) ................. 2022-058358

(51) Int. Cl.
  *B62D 25/06* (2006.01)
  *B62D 25/02* (2006.01)
  *B62D 27/02* (2006.01)
  *B62D 67/00* (2006.01)

(52) U.S. Cl.
  CPC ............ *B62D 25/02* (2013.01); *B62D 25/06* (2013.01); *B62D 27/02* (2013.01); *B62D 27/023* (2013.01)

(58) Field of Classification Search
  CPC ...... B62D 25/06; B62D 25/02; B62D 27/023; B62D 67/00

USPC .................. 296/201, 23.01, 2, 3, 29, 193.05
See application file for complete search history.

(56) References Cited

U.S. PATENT DOCUMENTS

2018/0257718 A1  9/2018  Kagami et al.

FOREIGN PATENT DOCUMENTS

| JP | 2002172984 A | * | 6/2002 | |
|---|---|---|---|---|
| JP | 2010247718 A | * | 11/2010 | |
| JP | 2018-149828 A |   | 9/2018 | |
| JP | 6691236 B2 | * | 4/2020 | B62D 27/02 |

OTHER PUBLICATIONS

JP2002172984 Text (Year: 2002).*
JP2010247718 Text (Year: 2010).*
JP6691236 Text (Year: 2020).*

* cited by examiner

*Primary Examiner* — Dennis H Pedder
(74) *Attorney, Agent, or Firm* — Rankin, Hill & Clark LLP

(57) ABSTRACT

A vehicle body upper structure includes: roof side rails; side outer panels; and a roof panel made of a material different from a martial of the roof side rails. The roof panel and the paired left and right side outer panels are fixed to one another by braze joining. An end portion of the roof panel in a vehicle front-rear direction includes a first coupling portion in which one of the roof side rails, the roof panel, and one of the side outer panels are coupled to one another, a notch portion that is provided on the inner side in the vehicle width direction of the first coupling portion, and a fragile portion that extends from a tip end portion of the notch portion toward a braze joining portion of the side outer panel and the roof panel.

4 Claims, 7 Drawing Sheets

VEHICLE BODY UPPER STRUCTURE

CROSS-REFERENCE TO RELATED APPLICATION

The present application claims the benefit of priority to Japanese Patent Application No. 2022-058358 filed on Mar. 31, 2022, the disclosures of all of which are hereby incorporated by reference in their entireties.

FIELD OF THE INVENTION

The present invention relates to a vehicle body upper structure of an automobile.

DESCRIPTION OF THE RELATED ART

In recent years, research and development relating to weight reduction that contributes to an increase in energy efficiency are conducted to allow more people to secure access to affordable, reliable, sustainable, advanced energy.

In an automobile, vehicle body members made of aluminum or a light alloy such as an aluminum alloy (hereinafter, referred to as "aluminum" as appropriate) are used to achieve weight reduction of a vehicle body (for example, see JP2018-149828A).

In a vehicle body upper structure described in JP2018-149828A, a roof side rail outer and a roof side rail inner made of steel plates and joined to each other and a side outer panel and a roof panel made of aluminum and joined to each other are mechanically connected to each other with non-penetrating rivets.

When an automobile with the aforementioned vehicle body upper structure is scrapped, the automobile is dismantled into parts with the parts being sorted into iron, non-iron, non-metal, and the like, and the parts are used as new materials such as recycled metals. For example, in order to take out high-purity aluminum from the scrapped vehicle body depending on the type of material, aluminum needs to be removed before cutting with a shredder. Accordingly, in a multi-material body employing an aluminum roof panel and an aluminum outer panel as described in JP2018-149828A, high-purity aluminum can be taken out by removing aluminum parts before the cutting.

SUMMARY OF THE INVENTION

However, in the automobile with the vehicle body upper structure described in JP2018-149828A, the roof panel and the parts around the roof panel are coupled to one another by mechanical fastening using rivets or the like. Accordingly, removal of only the roof panel employing aluminum is difficult.

Moreover, in a normal automobile, a grabbing tab for grabbing of the roof panel or the like with a large heavy machine such as a nibbler is not set. Accordingly, in the normal automobile, when the roof panel is to be torn off with the heavy machine such as the nibbler, although the roof panel can be grabbed with the nibbler, it is impossible to tear off only the roof panel, and there is a possibility that the parts around the roof panel are also torn off.

Moreover, in sorting with a shredder, when the sorting is performed by the specific gravity, fine, light-weight metal pieces of copper, stainless steel, and the like are mixed into aluminum pieces as impurities. Accordingly, it is impossible to obtain a high-purity aluminum scrap.

Moreover, aluminum is desirably finely sorted by components such as 6000 series, 5000 series, die-cast, and the like. However, magnetic sorting, sorting by specific gravity, or the like has a problem of mixing of these multiple types of aluminum.

The present invention has been thus made to solve the aforementioned problems, and an object is to provide a vehicle body upper structure that allows a roof panel to be grabbed and easily torn off from parts around the roof panel with a nibbler.

To solve the aforementioned problems, a vehicle body upper structure according to the present invention includes: roof side rails provided at end portions in a vehicle width direction of a vehicle body upper portion; side outer panels covering vehicle outer side surfaces of the roof side rails; and a roof panel made of a material different from a martial of the roof side rails and provided at a center portion in the vehicle width direction of the vehicle body upper portion, the roof panel and the paired left and right side outer panels are fixed to one another by braze joining, and an end portion of the roof panel in a vehicle front-rear direction includes a first coupling portion in which one of the roof side rails, the roof panel, and one of the side outer panels are coupled to one another, a notch portion that is provided on an inner side in the vehicle width direction of the first coupling portion, and a fragile portion that extends from a tip end portion of the notch portion toward a braze joining portion of the side outer panel and the roof panel.

According to the present invention, it is possible to provide a vehicle body upper structure that allows a roof panel to be grabbed and easily torn off from parts around the roof panel with a nibbler.

DETAILED DESCRIPTION OF THE EMBODIMENTS

An example of a vehicle body upper structure 100 according to an embodiment of the present invention is described with reference to FIGS. 1 to 5.

Figure 1:
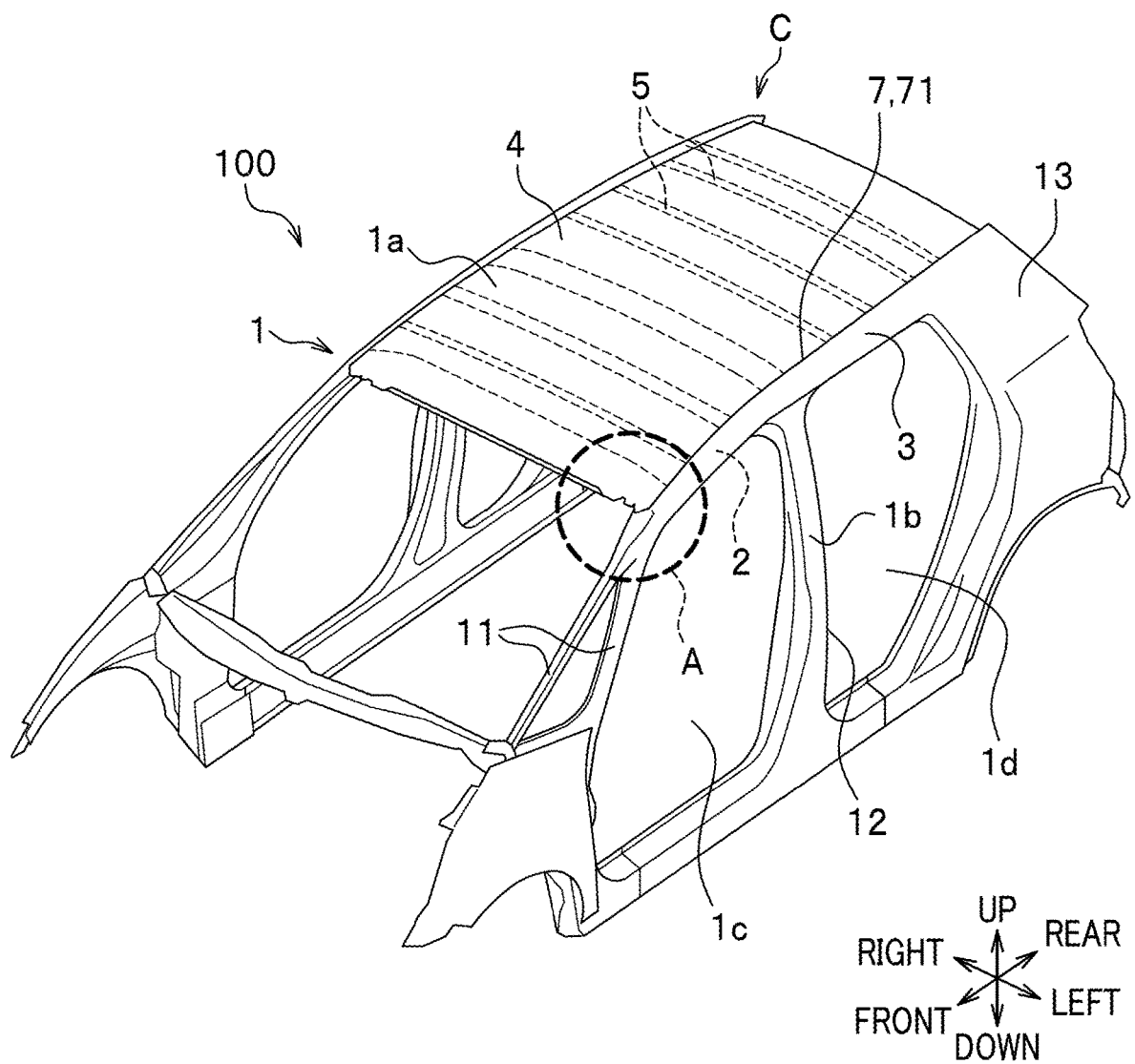
FIG. 1 is a schematic perspective view of a main portion showing an example of a vehicle body upper structure according to an embodiment of the present invention.

Note that the same components are denoted by the same reference numerals, and overlapping description is omitted. Moreover, in the embodiment of the present embodiment, as shown in FIG. 1, "front" is the side toward which a vehicle C moves forward, "rear" is the side toward which the vehicle C moves backward, "up" is the vertical upper side, and "down" is the vertical lower side.

<<Vehicle>>

First, the vehicle C to which the vehicle body upper structure 100 according to the present invention is applied is described, before description of the vehicle body upper structure 100 according to the embodiment of the present invention.

The vehicle C is an automobile that includes roof side rails 2 provided at end portions in a vehicle width direction of a vehicle body upper portion 1a, side outer panels 3 covering vehicle outer side surfaces of the roof side rails 2, and a roof panel 4 provided at a center portion in the vehicle width direction of the vehicle body upper portion 1a. The type, shape, and the like of the vehicle C are not limited to particular type, shape, and the like. The vehicle C may be a passenger car, a bus, a truck, a service vehicle, or the like as long as a vehicle body 1 includes the side outer panels 3 and the roof panel 4. Description is given below by using a passage car as an example of the vehicle C.

<<Vehicle Body Upper Structure>>

Figure 4:
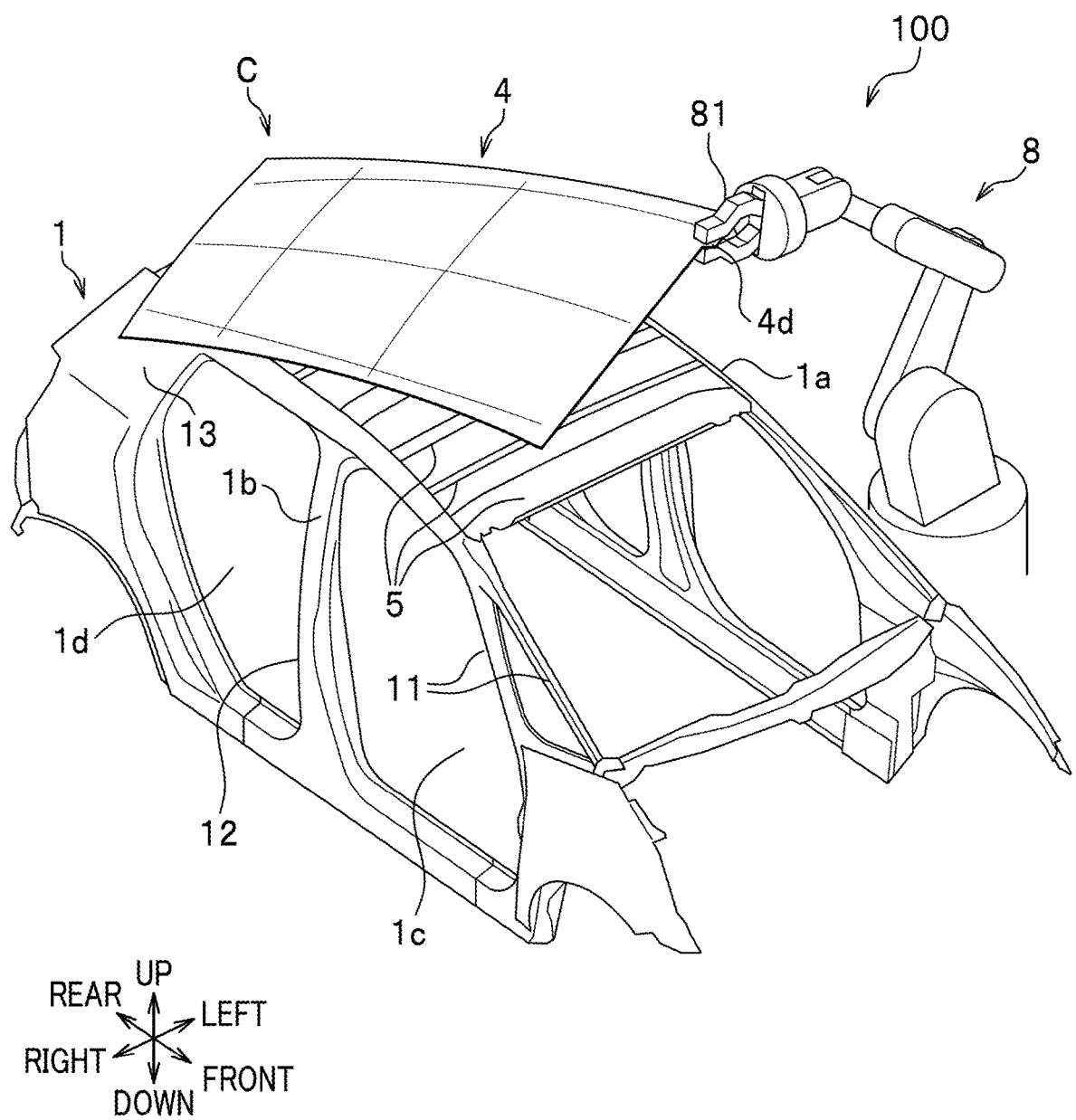
FIG. 4 is an enlarged perspective view of the main portion showing a state where a roof panel is torn off with a nibbler.

As shown in FIG. 4, the vehicle body upper structure 100 is configured to be capable of being torn off from the vehicle body 1 by grabbing the roof panel 4 with a nibbler 81 provided in a heavy machine 8. The vehicle body upper structure 100 is configured to include the roof side rails 2, the side outer panels 3, and the roof panel 4.

<<Vehicle Body>>

As shown in FIG. 1, the vehicle body 1 is a frame member for forming the entire vehicle C. The vehicle body 1 is configured to include, for example, various metal vehicle body frames such as the roof side rails 2 to be described later and metal vehicle body panels such as the roof panel 4.

In the vehicle body upper portion 1a, there are provided the roof panel 4 forming a plate portion of a roof, roof arches 5 installed below the roof panel 4 and forming a frame of a roof portion, and the side outer panels 3 installed at both ends in the vehicle width direction of the roof arches 5.

A door opening portion 1c for a front seat and a door opening portion 1d for a rear seat are formed in a vehicle body side portion 1b on each side of the vehicle body 1. A front pillar 11 is provided in front of the door opening portion 1c for the front seat. A center pillar 12 is provided between the door opening portion 1c for the front seat and the door opening portion 1d for the rear seat. A rear pillar 13 is provided behind the door opening portion 1d of the rear seat.

Note that, since the vehicle body 1 is formed to be substantially left-right symmetric, one of the passenger seat side (left side) and the driver seat side (right side) is mainly described, and the description of the other side is omitted as appropriate.

<<Roof Panel>>

Figure 2:
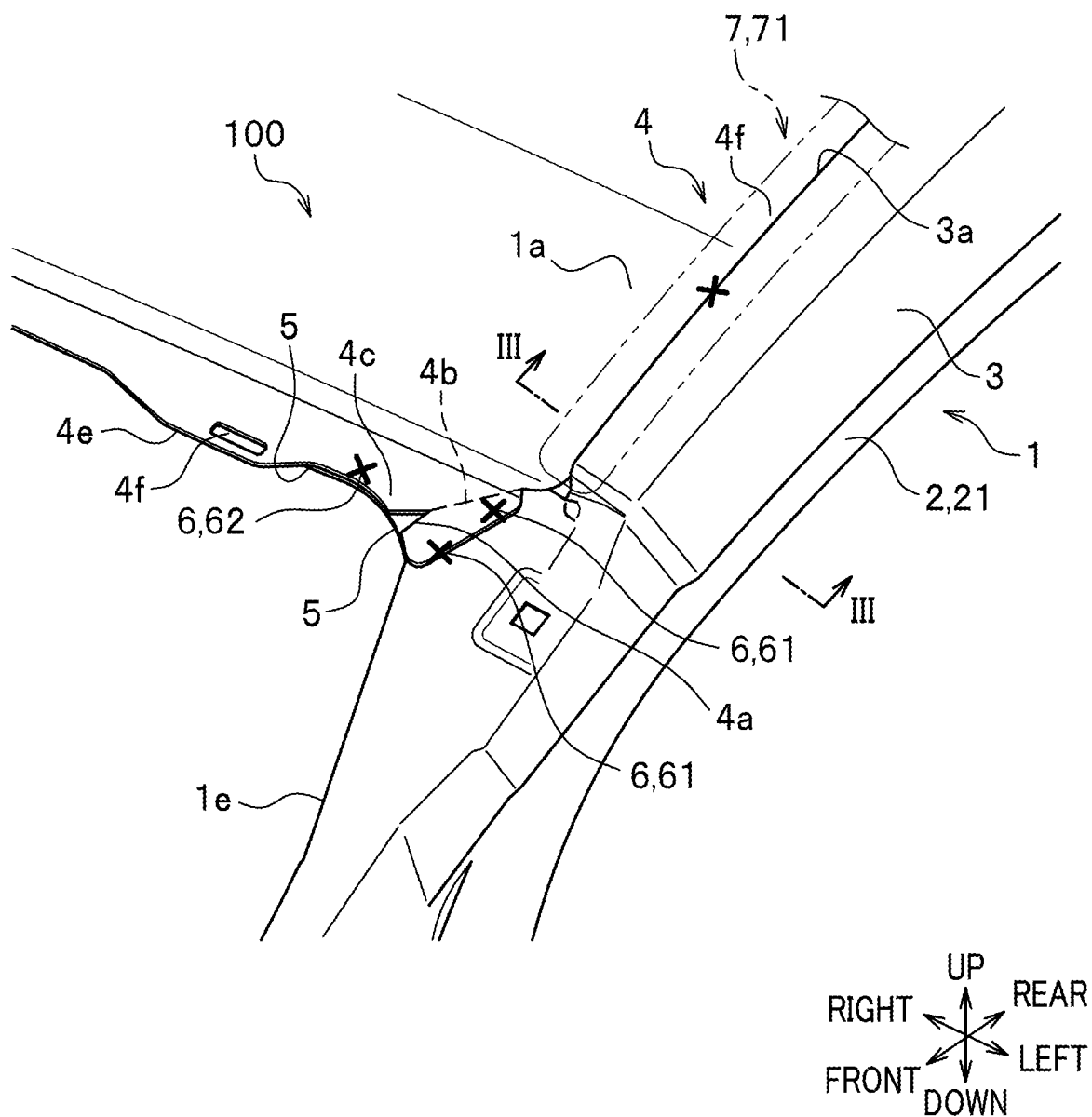
FIG. 2 is an enlarged view of an A-portion in FIG. 1.
Figure 3:
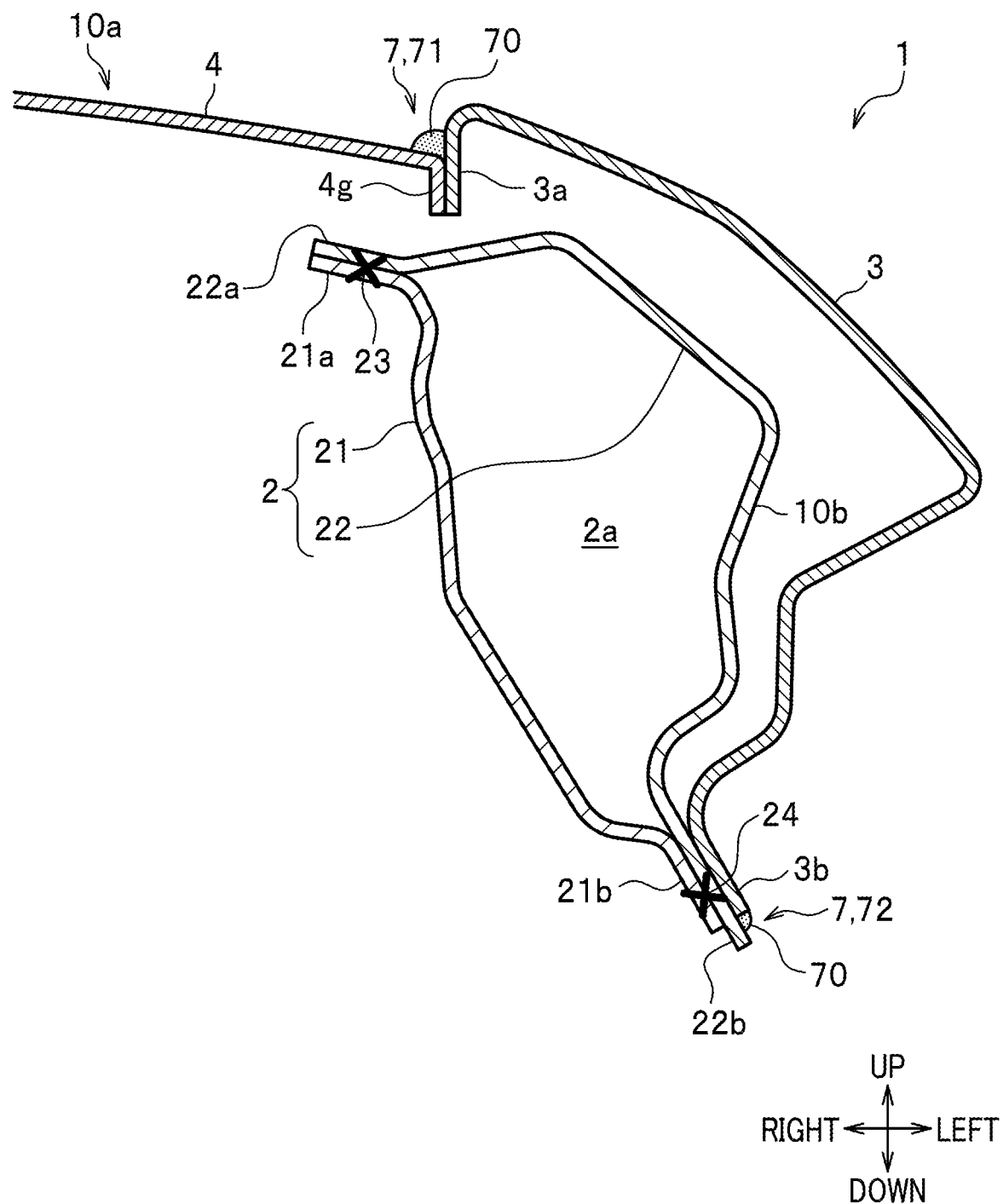
FIG. 3 is an enlarged cross-sectional view along a line III-III in FIG. 2.

The roof panel 4 shown in FIG. 1 is formed of a plate of a light metal such as aluminum formed in a substantially rectangular shape in a plan view. As shown in FIG. 2, a notch portion 4a, a fragile portion 4b, a wide portion 4c, and a grabbing tab 4e are formed in an end portion in the vehicle front-rear direction of the roof panel 4. As shown in FIG. 3, a bent portion 4g (braze joining portion 7) is formed in each of left and right end portions of the roof panel 4.

<Notch Portion>

As shown in FIG. 2, the notch portion 4a is a portion formed to allow the roof panel 4 to be stably cut from the end portion in the vehicle width direction of the roof panel 4 when the roof panel 4 is pulled by grabbing the grabbing tab 4e with the nibbler 81 (see FIG. 4). In other words, the notch portion 4a is a cut that acts as a starting point of ripping when the roof panel 4 is grabbed and pulled with the nibbler 81 (see FIG. 4). For example, the notch portion 4a is formed of a triangular cut groove formed between a first coupling portion 61 and the grabbing tab 4e formed in the end portion of the roof panel 4 in the front-rear direction. The notch portion 4a is provided on an inner side in the vehicle width direction of a coupling portion 6 (first coupling portion 61) in which one of the roof side rails 2, the roof panel 4, and one of the side outer panels 3 are coupled to one another.

<Fragile Portion>

The fragile portion 4b is a portion that can be easily cut when the roof panel 4 is pulled by grabbing the grabbing tab 4e with the nibbler 81 (see FIG. 4). For example, the fragile portion 4b is formed of a cut or the like formed in a V groove shape or a wavy-line shape on a back surface of the roof panel 4. The fragile portion 4b extends from a tip end portion of the notch portion 4a toward a front end portion of the braze joining portion 7 of the side outer panel 3 and the roof panel 4. Accordingly, in the fragile portion 4b, when the grabbing tab 4e of the roof panel 4 is pulled with the nibbler 81 (see FIG. 4), the roof panel 4 can be ripped from the notch portion 4a toward the braze joining portion 7 via the fragile portion 4b.

Note that the fragile portion 4b may be a portion made to have a lower strength than the other portions of the roof panel 4 by partially reducing the thickness of the roof panel 4.

<Wide Portion>

The wide portion 4c is a portion formed such that the width thereof in the front-rear direction increases while the wide portion 4c extends toward the vehicle outer side along the shape of the roof panel 4. The wide portion 4c is provided on the inner side in the vehicle width direction of the notch portion 4a. The wide portion 4c is formed between the notch portion 4a and a second coupling portion 62 in which the roof panel 4 and the roof arch 5 provided on a lower surface of the roof panel 4 and provided to extend in the vehicle width direction are coupled to each other.

In detail, the roof arch 5 provided to extend in the vehicle width direction along a front edge of the roof panel 4 is arranged below the roof panel 4. The first coupling portion 61 and the second coupling portion 62 to be described later are provided in the front edge of the roof panel 4. Moreover, the wide portion 4c whose width in the vehicle front-rear direction increases while extending from the second coupling portion 62 toward the first coupling portion 61 is provided in the front edge of the roof panel 4. The notch portion 4a is provided on the wide portion 4c, between the second coupling portion 62 and the first coupling portion 61.

<Grabbing Tab>

The grabbing tab 4e is a portion formed in a shape that can be grabbed with the nibbler 81 when the roof panel 4 is removed from the vehicle body 1. When the roof panel 4 is grabbed and torn off from the vehicle body 1 with the nibbler 81, the roof panel 4 is separated from the vehicle body 1 by grabbing and pulling the grabbing tab 4e. The grabbing tab 4e is provided to protrude at a position near and on the inner side in the vehicle width direction of the wide portion 4c of the roof panel 4 and the second coupling portion 62. In the grabbing tab 4e, there is formed a through-hole 4f for facilitating the grabbing and pulling of the grabbing tab 4e with the nibbler 81 in the case where the roof panel 4 is grabbed and pulled with the nibbler 81. For example, the through-hole 4f is formed of a long hole elongated in the vehicle width direction. The grabbing tab 4e protrudes forward beyond a front end edge of the roof arch 5 to be described later. Note that the grabbing tab 4e and the through-hole 4f may be used for positioning of a windshield.

<Bent Portion>

The bent portion 4g is a portion for forming the braze joining portion 7 that is blaze-joined to an upper end portion of the side outer panel 3 with a brazing material 70 to be connected and fixed thereto. The bent portion 4g is formed by perpendicularly bending the end portion in the vehicle width direction of the roof panel 4 downward. An outer end portion of the bent portion 4g in the vehicle width direction is braze-joined to a side outer upper flap portion 3a while being brought into contact therewith. A lower end of the bent portion 4g is arranged to be separated from an upper surface of a rail outer upper flap portion 22a of a rail outer 22.

<<Braze Joining Portion>>

As shown in FIG. 3, the braze joining portion 7 is a portion where joining is performed by braze joining (also referred to as "brazing welding"). The braze joining portion 7 includes a first braze joining portion 71 and a second braze joining portion 72. An aluminum alloy is used as the brazing material 70 used in the braze joining portion 7.

The first braze joining portion 71 joins the bent portion 4g of the roof panel 4 and the side outer upper flap portion 3a of the side outer panel 3 to each other. The first braze joining portion 71 is provided to extend from a front end portion to a rear end portion of an outer end portion in the vehicle width direction of the roof panel 4.

The second braze joining portion 72 joins a rail outer lower flap portion 22b of the roof side rail 2 and a side outer lower flap portion 3b of the side outer panel 3 to each other. The second braze joining portion 72 is provided to extend from a front end portion to a rear end portion of an outer lower end portion in the vehicle width direction of the side outer panel 3.

<<Coupling Portion>>

As shown in FIG. 2, the coupling portion 6 described above is a portion where the roof panel 4 is coupled to the vehicle body 1. The coupling portion 6 is formed to mainly include the first coupling portion 61 and the second coupling portion 62.

The first coupling portion 61 is a coupling point where the roof side rail 2, the roof panel 4, and the side outer panel 3 are coupled to one another by laser welding, spot welding, or the like while being arranged to be stacked one on top of another in three layers. The first coupling portion 61 is provided at two locations on an outer front end portion in the vehicle width direction of the roof panel 4.

The second coupling portion 62 is a coupling point where the roof arch 5 and the roof panel 4 are coupled to each other by laser welding or the like while being arranged to be stacked one on top of the other in two layers. The second coupling portion 62 is arranged on the based end side (rear side) of the grabbing tab 4e, on the inner side in the vehicle width direction of the first coupling portion 61 and the fragile portion 4b in the roof panel 4. The second coupling portion 62 in the present embodiment has lower coupling strength than the first coupling portion 61 coupled at two points. Accordingly, in the tearing-off of the roof panel 4, the second coupling portion 62 is likely to be torn off preferentially over the first coupling portion 61.

<<Roof Arch>>

As shown in FIG. 1, the roof arches 5 are members that support the roof panel 4 (see FIG. 2) from below. The roof arches 5 are formed of multiple members laid between the left and right roof side rails 2. The roof arches 5 are arranged at appropriate intervals from a front end to a rear end of the vehicle body upper portion 1a.

Figure 5:
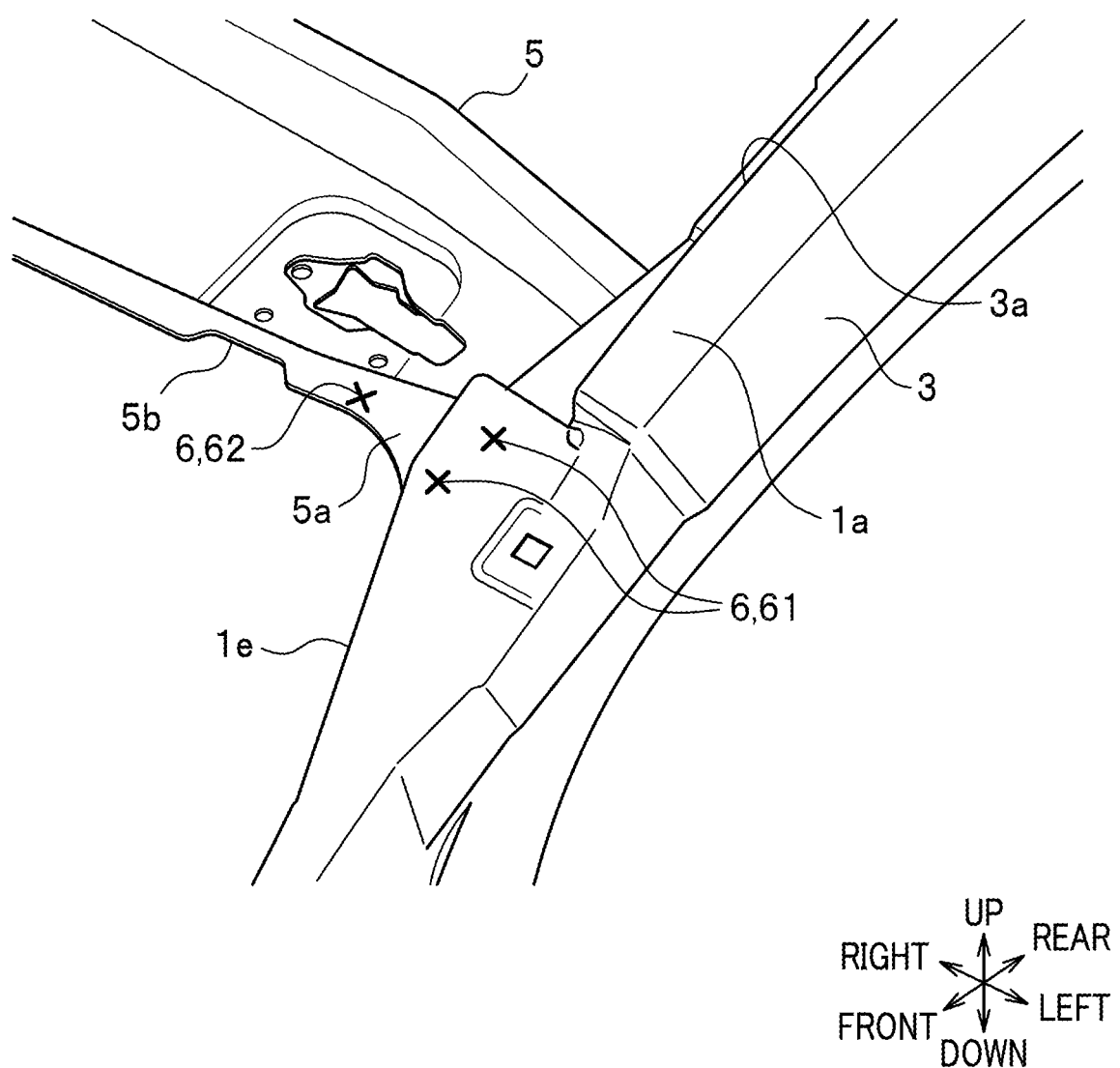
FIG. 5 is an enlarged view of the A-portion in FIG. 1 showing a state where the roof panel is torn off.

As shown in FIG. 5 or 2, in the roof arch 5 arranged on the vehicle front end side, an arch-shaped widened portion 5a is formed at a position overlapping the wide portion 4c of the roof panel 4, and a notch groove 5b is formed at a position overlapping the grabbing tab 4e and the through-hole 4f.

The first coupling portion 61 described above is provided on the outer side in the vehicle width direction of the arch-shaped widened portion 5a, and the second coupling portion 62 described above is provided on the inner side in the vehicle width direction of the arch-shaped widened portion 5a. Accordingly, the arch-shaped widened portion 5a can be firmly joined to the roof panel 4 and the side outer panel 3 by the first coupling portion 61. Moreover, the arch-shaped widened portion 5a can be firmly joined to the roof panel 4 by the second coupling portion 62.

The notch groove 5b is provided at the position overlapping the grabbing tab 4e and the through-hole 4f, and can thereby facilitate grabbing of only the grabbing tab 4e when the grabbing tab 4e is grabbed with the nibbler 81 (see FIG. 4) to tear off the roof panel 4.

<<Roof Side Rails>>

As shown in FIG. 1, the roof side rails 2 are paired left and right tubular frame members arranged above the vehicle body side portions 1b to extend in the front-rear direction. The roof side rails 2 are installed to extend from front ends to rear ends of left and right portions of the vehicle body upper portion 1a, and form upper edges of the door opening portions 1c and 1d. The front pillar 11 is joined to a front end of each roof side rail 2. The center pillar 12 is joined to a center portion of each roof side rail 2. The rear pillar 13 is joined to a rear end of each roof side rail 2.

As shown in FIG. 3, in each roof side rail 2, a rail inner 21 arranged on the vehicle inner side and the rail outer 22 arranged on the vehicle outer side of the rail inner 21 are joined in joining portions 24 and 23 to form a closed cross section 2a in a vertical cross-sectional view. The rail inner 21 and the rail outer 22 are made of steel (for example, high tensile strength steel plate or the like), unlike the roof panel 4 and the side outer panels 3 made of aluminum.

<Rail Inner>

As shown in FIG. 3, the rail inner 21 is a member that holds the roof panel 4 and the roof arches 5 (see FIG. 4). The rail inner 21 is a half body that forms a vehicle inner side portion of the roof side rail 2 formed in a tubular shape by the rail inner 21 and the rail outer 22. The rail inner 21 includes a rail inner upper flap portion 21a formed by bending an upper edge portion substantially horizontally toward the vehicle body inner side and a rail inner lower flap portion 21b formed by bending a lower end portion obliquely downward toward the vehicle body inner side.

<Rail Outer>

The rail outer 22 is a half body that forms a vehicle outer side portion of the roof side rail 2. The rail outer 22 is arranged to face the rail inner 21 with the closed cross section 2a arranged between the rail outer 22 and the rail inner 21, and is provided to extend in the front-rear direction. The rail outer 22 includes the rail outer upper flap portion 22a provided in an upper edge portion to extend in the front-rear direction and the rail outer lower flap portion 22b provided in a lower edge portion to extend in the front-rear direction.

The rail outer upper flap portion 22a is laid on top of the rail inner upper flap portion 21a and spot-welded in the joining portion 23 to be joined to the rail inner upper flap portion 21a. The rail outer lower flap portion 22b is laid on the rail inner lower flap portion 21b and spot-welded in the joining portion 24 to be joined to the rail inner lower flap portion 21b. Moreover, the side outer lower flap portion 3b is laid on the rail outer lower flap portion 22b, and the rail outer lower flap portion 22b is braze-joined in the second braze joining portion 72 with the brazing material 70 to be joined to the side outer panel 3.

<<Side Outer Panels>>

As shown in FIG. 3, the side outer panels 3 are panel members arranged to cover the roof side rails 2 from the vehicle outer sides. The side outer panels 3 are formed of paired left and right members provided to extend in the front-rear direction. Each side outer panel 3 includes the side outer upper flap portion 3a formed in an upper edge portion and provided to extend in the front-rear direction and the side outer lower flap portion 3b formed in a lower edge portion and provided to extend in the front-rear direction. Each side outer panel 3 and the roof panel 4 are fixed to each other by braze-joining the side outer upper flap portion 3a and the bent portion 4g to each other.

The side outer upper flap portion 3a is formed by perpendicularly bending an upper end of the side outer panel 3 downward. A lower end of the side outer upper flap portion 3a is arranged to be separated from an upper portion of the rail outer 22.

The side outer lower flap portion 3b is formed by bending a lower end portion of the side outer panel 3 obliquely downward toward the outer side in the vehicle width direction along the rail outer lower flap portion 22b.

<<Nibbler>>

As shown in FIG. 4, the nibbler 81 is a device for grabbing a metal plate or cutting a metal plate by punching. The nibbler 81 is provided in the heavy machine 8 used for dismantling of the vehicle C or the like.

<<Effects of Vehicle Body Upper Structure>>

Next, effects of the vehicle body upper structure 100 according to the embodiment of the present invention are described with reference to FIGS. 1 to 5.

As shown in FIG. 1, the roof panel 4 is formed of a substantially rectangular aluminum plate material. As shown in FIG. 2, the notch portion 4a, the fragile portion 4b, the wide portion 4c, the grabbing tab 4e, and the through-hole 4f described above are formed at the outer end portion in the vehicle width direction of the vehicle front end portion of the roof panel 4. The first coupling portion 61 joins the outer end portion in the vehicle width direction of the vehicle front end portion of the roof panel 4 to the roof arch 5, the roof side rail 2, and the side outer panel 3 by laser welding or the like. Moreover, the second coupling portion 62 joins the outer end portion in the vehicle width direction of the vehicle front end portion of the roof panel 4 to the roof arch 5 by laser welding or the like.

As shown in FIG. 3, the bent portion 4g is formed in each of the outer end portions I the vehicle width direction of the roof panel 4. In the first braze joining portion 71 in the outer end portion in the vehicle width direction of the aluminum roof panel 4, the bent portion 4g is brought into contact with the side outer upper flap portion 3a of the aluminum side outer panel 3, and joined thereto by being braze-joined with the aluminum brazing material 70.

As described above, the aluminum roof panel 4 is joined to the aluminum side outer panel 3 with the aluminum brazing material 70, and is not joined to the steel roof side rail 2. Accordingly, the roof panel 4 has few joining locations to the roof side rail 2. Thus, it is possible to reduce work steps in attachment and to also separate the roof panel 4 such that no iron such as the roof side rail 2 is included in reprocessing.

In the second braze joining portion 72 of the side outer panel 3, the side outer lower flap portion 3b is laid on the joining portion 24 of the rail inner lower flap portion 21b and the rail outer lower flap portion 22b, and braze-joined thereto with the aluminum brazing material 70.

As described above, the side outer panel 3 is joined to the roof side rail 2 by joining only one location of the side outer lower flap portion 3b to the joining portion 24 of the rail inner lower flap portion 21b and the rail outer lower flap portion 22b. Accordingly, the side outer panel 3 has few joining locations to the roof side rail 2. Thus, it is possible to reduce work steps in attachment and minimize separation work steps in reprocessing.

As shown in FIG. 4, the roof panel 4 of the vehicle C to be scrapped is separated from the vehicle body 1 by grabbing a position close to the outer side in the vehicle width direction of the vehicle front end portion of the roof panel 4 with the nibbler 81. In the roof panel 4, since the grabbing tab 4e is formed to protrude at the position close to the outer side in the vehicle width direction of the vehicle front end portion, the grabbing tab 4e can be easily grabbed with the nibbler 81. Accordingly, vehicle body separation work with the nibbler 81 can be facilitated.

Since the notch portion 4a is formed at a base of the grabbing tab 4e and the fragile portion 4b is formed continuously with the notch portion 4a in the roof panel 4 as shown in FIG. 2, the notch portion 4a and the fragile portion 4b can be ripped when the grabbing tab 4e is grabbed and pulled with the nibbler 81. Moreover, the braze joining portion 7 joined with the aluminum brazing material 70 is provided to extend in the vehicle rear direction, on an extended line of the fragile portion 4b toward the rear side.

Accordingly, when the grabbing tab 4e is grabbed and pulled with the nibbler 81, only the aluminum roof panel 4 can be separated from the vehicle body 1. Since no joined steel members such as the roof arch 5, the rail outer 22, or the rail inner 21 are attached to the separated roof panel 4, the roof panel 4 can be torn off from the vehicle body 1 in a state where the roof panel 4 includes only high-purity aluminum members.

Accordingly, the roof panel 4 separated from the vehicle body 1 can be obtained as a high-purity aluminum scrap in which no impurities that are not aluminum such as iron is mixed. Thus, recycling can be facilitated.

As described above, as shown in FIG. 2, the vehicle body upper structure 100 according to the present invention includes the roof side rails 2 provided at the end portions in the vehicle width direction of the vehicle body upper portion 1a, the side outer panels 3 covering the vehicle outer side surfaces of the roof side rails 2, and the roof panel 4 made of the material different from the martial of the roof side rails 2 and provided at the center portion in the vehicle width direction of the vehicle body upper portion 1a, the roof panel 4 and the paired left and right side outer panels 3 are fixed to one another by braze joining, and the end portion of the roof panel 4 in the vehicle front-rear direction includes the first coupling portion 61 in which one of the roof side rails 2, the roof panel 4, and one of the side outer panels 3 are coupled to one another, the notch portion 4a provided on the inner side in the vehicle width direction of the first coupling portion 61, and the fragile portion 4b that extends from the tip end portion of the notch portion 4a toward the braze joining portion 7 (first braze joining portion 71) of the side outer panel 3 and the roof panel 4.

According to such a configuration, in the vehicle body upper structure 100, the first coupling portion 61 and the notch portion 4a provided on the inner side in the vehicle width direction of the first coupling portion 61 is formed in the end portion of the roof panel 4 in the vehicle front-rear direction. In the roof panel 4, since the first coupling portion 61 is firmly fixed to the vehicle body 1, grabbing and pulling the roof panel 4 with the nibbler 81 causes the roof panel 4 to be ripped from the notch portion 4a on the inner side in the vehicle width direction of the first coupling portion 61, and the roof panel 4 can be easily torn off from parts around the roof panel 4.

Moreover, in the roof panel 4, there is formed the fragile portion 4b that extends from the tip end portion of the notch portion 4a toward the braze joining portion 7 (first braze joining portion 71) of the side outer panel 3 and the roof panel 4. Accordingly, the roof panel 4 is continuously torn from the notch portion 4a to the fragile portion 4b, and to the braze joining portion 7 by being grabbed and pulled with the nibbler 81, and can be thus easily torn off from the vehicle body 1. The torn-off roof panel 4 includes no impurities that are not aluminum such as iron, and a high-purity aluminum scrap can be thus obtained.

Moreover, as shown in FIG. 2, the vehicle body upper structure 100 of the present invention further includes the roof arch 5 provided below the roof panel 4 to extend in the vehicle width direction along the front edge of the roof panel 4, the roof panel 4 includes the second coupling portion 62 in which the roof panel 4 and the roof arch 5 are coupled to each other on the inner side in the vehicle width direction of the first coupling portion 61 and the wide portion 4c whose width in the vehicle front-rear direction increases while extending from the second coupling portion 62 toward the first coupling portion 61 in the front edge of the roof panel 4, and the notch portion 4a is provided on the wide portion 4c, between the second coupling portion 62 and the first coupling portion 61.

According to such a configuration, the roof panel 4 includes the wide portion 4c whose width in the vehicle front-rear direction increases while extending from the second coupling portion 62 toward the first coupling portion 61 in the front edge and the notch portion 4a provided on the wide portion 4c, between the second coupling portion 62 and the first coupling portion 61. The roof panel 4 is thus reinforced on the inner side and outer side in the vehicle width direction of the notch portion 4a by the wide portion 4c. Accordingly, the roof panel 4 can be torn off from the second coupling portion 62 with the roof arch 5 and be surely ripped from the notch portion 4a by being grabbed and pulled with the nibbler 81.

Moreover, as shown in FIG. 3, the side outer panels 3 and the roof panel 4 are made of aluminum, the roof side rails 2 are made of steel, and the brazing material 70 for the braze joining is made of the aluminum alloy.

In such a configuration, the roof side rails 2 and the set of the side outer panels 3 and the roof panel 4 are joined by braze joining using the aluminum alloy brazing material 70. Accordingly, the aluminum side outer panels 3 and roof panel 4 and the steel roof side rails 2 can be firmly joined to one another with the aluminum alloy brazing material 70, even though these parts are made of different materials.

Moreover, when the aluminum side outer panels 3 and roof panel 4 are torn off from the steel roof side rails 2 with the nibbler 81 or the like, since the side outer panels 3 and the roof panel 4 are joined with the aluminum brazing material 70, no steel material is mixed. Accordingly, it is possible to take out high-purity aluminum in which no iron or the like is mixed, by removing only the aluminum parts before cutting of the side outer panels 3 and the roof panel 4.

Furthermore, since the side outer panels 3 and the roof panel 4 are joined with the aluminum brazing material 70, joining strength is lower than that in a portion where steel members are welded. Accordingly, parts can be easily separated from the portion where the parts are joined with the aluminum brazing material 70.

Furthermore, as shown in FIG. 2, the grabbing tab 4e is formed in the end portion of the roof panel 4 in the vehicle front-rear direction.

In such a configuration, forming the grabbing tab 4e in the roof panel 4 allows the grabbing tab 4e to be easily grabbed and torn off with the nibbler 81 (see FIG. 4) in the dismantling of the vehicle C.

[First Modification]

Note that the present invention is not limited to the aforementioned embodiment. Various modifications and changes can be made within the scope of the technical idea of the present invention, and the present invention encompasses these modified and changed inventions as a matter of course.

Figure 6:
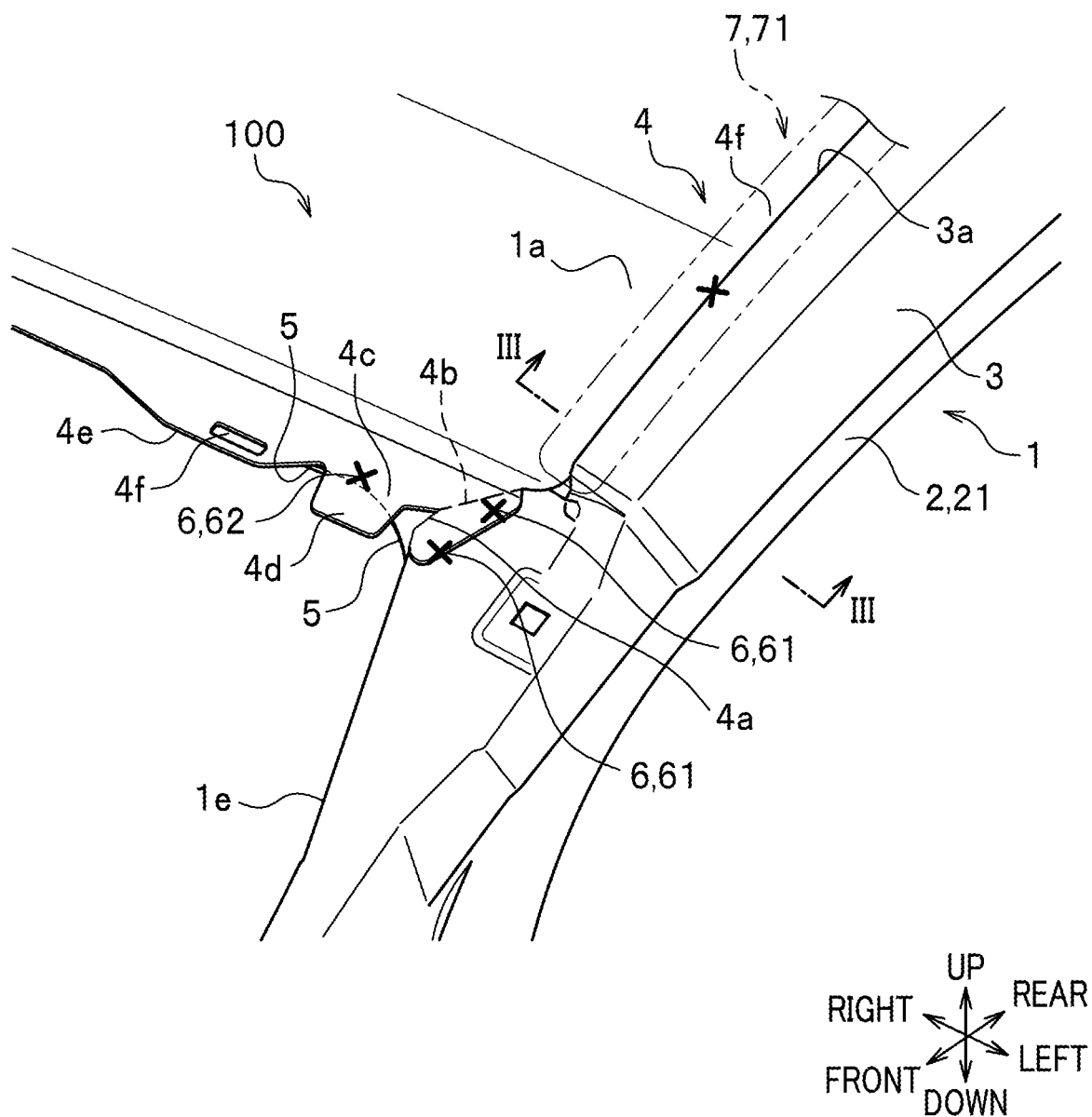
FIG. 6 is a schematic perspective view of the main portion showing a modification of the vehicle body upper structure according to the embodiment of the present invention.

FIG. 6 is a main portion schematic perspective view showing a first modification of the vehicle body upper structure 100 according to the embodiment of the present invention.

As shown in FIG. 6, a protruding piece 4d that facilitates grabbing and pulling with the nibbler 81 (see FIG. 4) in the case where the roof panel 4 is grabbed and torn off from the vehicle body 1 with the nibbler 81 (see FIG. 4) may be formed in the end portion of the roof panel 4 in the vehicle front-rear direction.

The protruding piece 4d may have any shape that can be grabbed with the nibbler 81, and is formed of, for example, a protruding piece with a trapezoidal shape in a plan view. The protruding piece 4d is formed between the notch portion 4a and the grabbing tab 4e. The protruding piece 4d is formed in front of the second coupling portion 62.

In such a configuration, forming the protruding piece 4d in the end portion of the roof panel 4 in the vehicle front-rear direction can facilitate grabbing of the roof panel 4 with the nibbler 81 (see FIG. 4) in the case where the roof panel 4 is grabbed and torn off from the vehicle body 1 with the nibbler 81 (see FIG. 4).

Moreover, forming the protruding piece 4d at a position adjacent to the notch portion 4a can further increase the width in the front-rear direction of the roof panel 4 on the inner side in the vehicle width direction of the notch portion 4a and improve the strength. Accordingly, forming the protruding piece 4d allows the roof panel 4 to be surely ripped from the notch portion 4a when the roof panel 4 is grabbed and pulled with the nibbler 81 (see FIG. 4).

[Second Modification]

Figure 7:
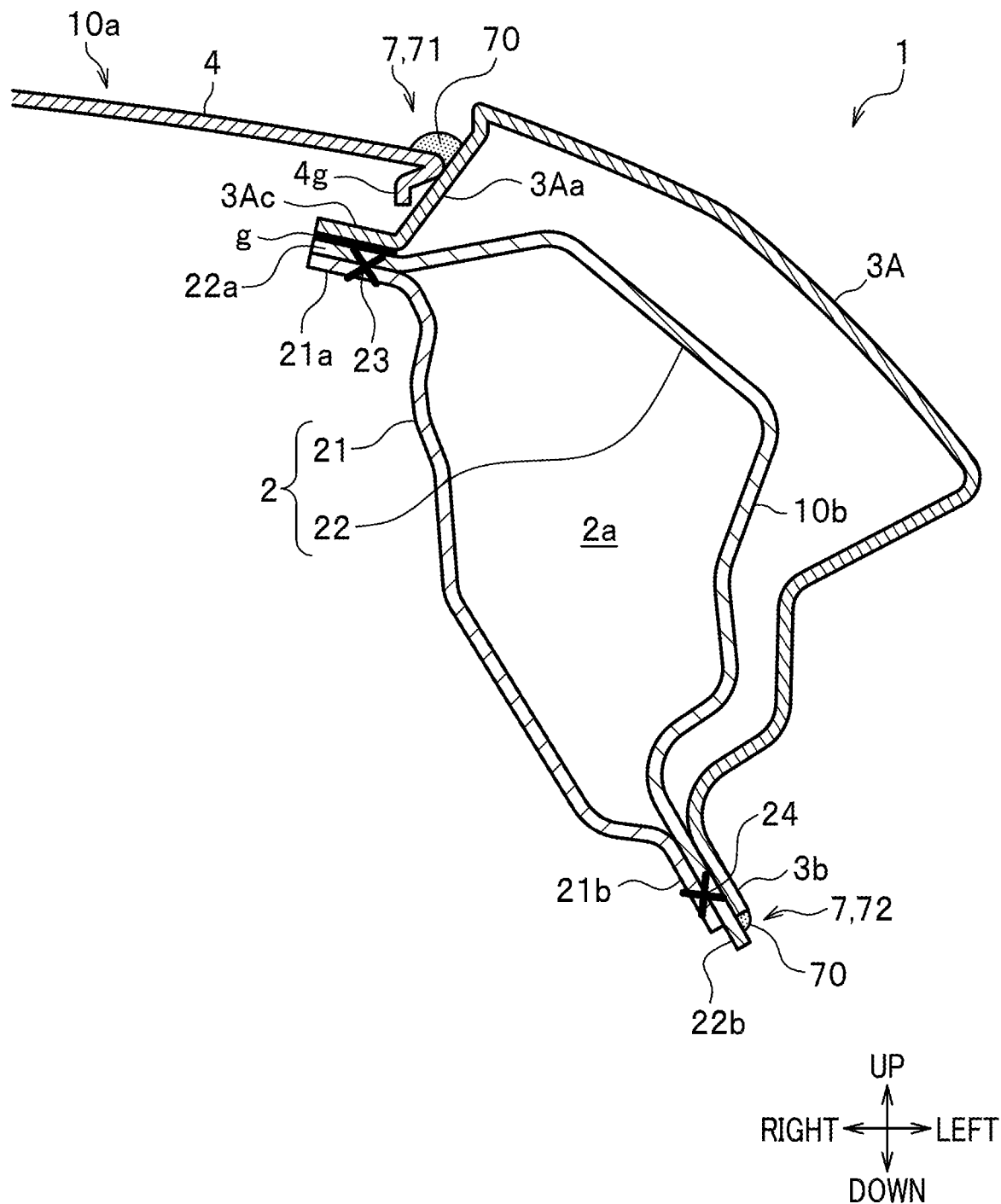
FIG. 7 is a schematic cross-sectional view of the main portion showing a second modification of the vehicle body upper structure according to the embodiment of the present invention.

FIG. 7 is a main portion schematic cross-sectional view showing a second modification of the vehicle body upper structure 100 according to the embodiment of the present invention.

In the side outer panel 3 (see FIG. 3) described in the aforementioned embodiment, as in a side outer panel 3A shown in FIG. 7, there may be formed a mount portion 3Ac on the distal end side of a side outer upper flap portion 3Aa joined to the roof panel 4, the mount portion 3Ac bonded onto the rail outer upper flap portion 22a of the rail outer 22.

In this case, the side outer upper flap portion 3Aa is formed to extend obliquely downward toward the inner side in the vehicle width direction, from an upper end portion of the side outer panel 3A toward a portion above the rail outer upper flap portion 22a. The upper end portion of the side outer upper flap portion 3Aa is not in contact with the roof panel 4. The braze joining portion 7 braze-joined to the roof panel 4 is provided in a middle portion of the side outer upper flap portion 3Aa. The mount portion 3Ac is continuously formed in a lower end portion of the side outer upper flap portion 3Aa.

The mount portion 3Ac is formed to be substantially horizontally bent to extend from the distal end of the rail outer upper flap portion 22a toward the inner side in the vehicle width direction such that the mount portion 3Ac can be stably placed on the rail outer upper flap portion 22a. The mount portion 3Ac is bonded onto the rail outer upper flap portion 22a with adhesive g.

The adhesive g is made of a thermal-setting resin or the like. Accordingly, the mount portion 3Ac of the side outer panel 3A and the rail outer upper flap portion 22a of the rail outer 22 are not joined to each other by a direct joining method such as spot welding or a mechanical joining method such as rivets and bolts.

According to such a configuration, in the second modification of the vehicle body upper structure 100 of the present invention, forming the mount portion 3Ac in the side outer panel 3A allows the mount portion 3Ac to be stably placed on and joined to the rail outer upper flap portion 22a when the side outer panel 3A joined to the roof panel 4 is joined to the rail outer 22 with the adhesive g. Accordingly, the mount portion 3Ac can be accurately bonded at a predetermined position on the rail outer upper flap portion 22a of the rail outer 22.

[Other Modifications]

Although the case where the grabbing tab 4e is formed in one location in the left end portion of the front end in the vehicle front-rear direction of the roof panel 4 is described in the aforementioned embodiment as an example of the present invention, the configuration is not limited to this. For example, the grabbing tab 4e may be formed in any one of a right end portion of the front end in the vehicle front-rear direction of the roof panel 4, and a left end portion and a right end portion of the rear end in the vehicle front-rear direction of the roof panel 4. Alternatively, the grabbing tab 4e may be formed in multiple locations in the left and right end portions of the front and rear ends in the vehicle front-rear direction of the roof panel 4.

Moreover, in the aforementioned embodiment, the triangular notch formed on the outer side in the vehicle width direction of the grabbing tab 4e formed in the end portion in the front-rear direction of the roof panel 4 is described as an example of the notch portion 4a. The notch portion 4a only needs to be easily ripped when the roof panel 4 is grabbed and pulled with the nibbler 81 or the like, and the shape of the notch portion 4a may be changed as appropriate. The notch portion 4a may be a cut formed in a groove shape (slit shape), a linear cut simply formed to be merely ripped, or the like.

What is claimed is:

1. A vehicle body upper structure comprising:
   roof side rails provided at end portions in a vehicle width direction of a vehicle body upper portion;
   side outer panels covering vehicle outer side surfaces of the roof side rails; and
   a roof panel made of a material different from a martial of the roof side rails and provided at a center portion in the vehicle width direction of the vehicle body upper portion, wherein
   the roof panel and the paired left and right side outer panels are fixed to one another by braze joining, and
   an end portion of the roof panel in a vehicle front-rear direction includes
      a first coupling portion in which one of the roof side rails, the roof panel, and one of the side outer panels are coupled to one another,
      a notch portion that is provided on an inner side in the vehicle width direction of the first coupling portion, and
      a fragile portion that extends from a tip end portion of the notch portion toward a braze joining portion of the side outer panel and the roof panel.

2. The vehicle body upper structure according to claim 1, further comprising a roof arch provided below the roof panel to extend in the vehicle width direction along a front edge of the roof panel, wherein
   the roof panel includes
      a second coupling portion in which the roof panel and the roof arch are coupled to each other on the inner side in the vehicle width direction of the first coupling portion, and
      a wide portion whose width in the vehicle front-rear direction increases while extending from the second coupling portion toward the first coupling portion in the front edge of the roof panel, and
   the notch portion is provided on the wide portion, between the second coupling portion and the first coupling portion.

3. The vehicle body upper structure according to claim 1, wherein
   the side outer panels and the roof panel are made of aluminum,
   the roof side rails are made of steel, and
   a brazing material for the braze joining is made of an aluminum alloy.

4. The vehicle body upper structure according to claim 1, wherein a grabbing tab is formed in the end portion of the roof panel in the vehicle front-rear direction.

* * * * *